US006709993B2

(12) United States Patent
Strength et al.

(10) Patent No.: US 6,709,993 B2
(45) Date of Patent: Mar. 23, 2004

(54) CAMOUFLAGE

(75) Inventors: John David Strength, Spartanburg, SC (US); Allan W. Smith, Gaffney, SC (US); Gary K. Greene, Spartanbug, SC (US); Thomas E. Godfrey, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 163 days.

(21) Appl. No.: 09/994,087

(22) Filed: Nov. 21, 2001

(65) Prior Publication Data

US 2003/0096546 A1 May 22, 2003

(51) Int. Cl.[7] .................. B32B 27/02; B32B 27/12; B32B 27/18
(52) U.S. Cl. .................. 442/131; 428/195.1; 428/196; 428/919; 442/132; 442/164; 442/286; 442/294
(58) Field of Search ................ 442/131–133, 442/164, 286–294, 65–68, 70–72, 74; 428/195.1, 196, 919

(56) References Cited

U.S. PATENT DOCUMENTS

| 4,576,865 A | * | 3/1986 | Akao |
| 5,591,530 A | * | 1/1997 | Warner et al. |
| 6,194,329 B1 | * | 2/2001 | Nelson et al. |
| 2002/0127361 A1 | * | 9/2002 | Sandt et al. ............... 428/40.1 |

OTHER PUBLICATIONS

PCT International Search Report; PCT/US02/30710; International Filing Date Sep. 27, 2002.

* cited by examiner

Primary Examiner—Cheryl A. Juska
Assistant Examiner—Jenna-Leigh Befumo
(74) Attorney, Agent, or Firm—Terry T. Moyer; Jeffery E. Bacon

(57) ABSTRACT

A base textile has a camouflage pattern on the first surface and a coating on the second surface. The coating is a ethylene methyl acrylate thermoplastic with a carbon black pigment. The base textile and coating have a visible light transmission such that shadows of hunters or others inside a blind of the camouflage are not visible on the opposite side of the camouflage.

6 Claims, 2 Drawing Sheets

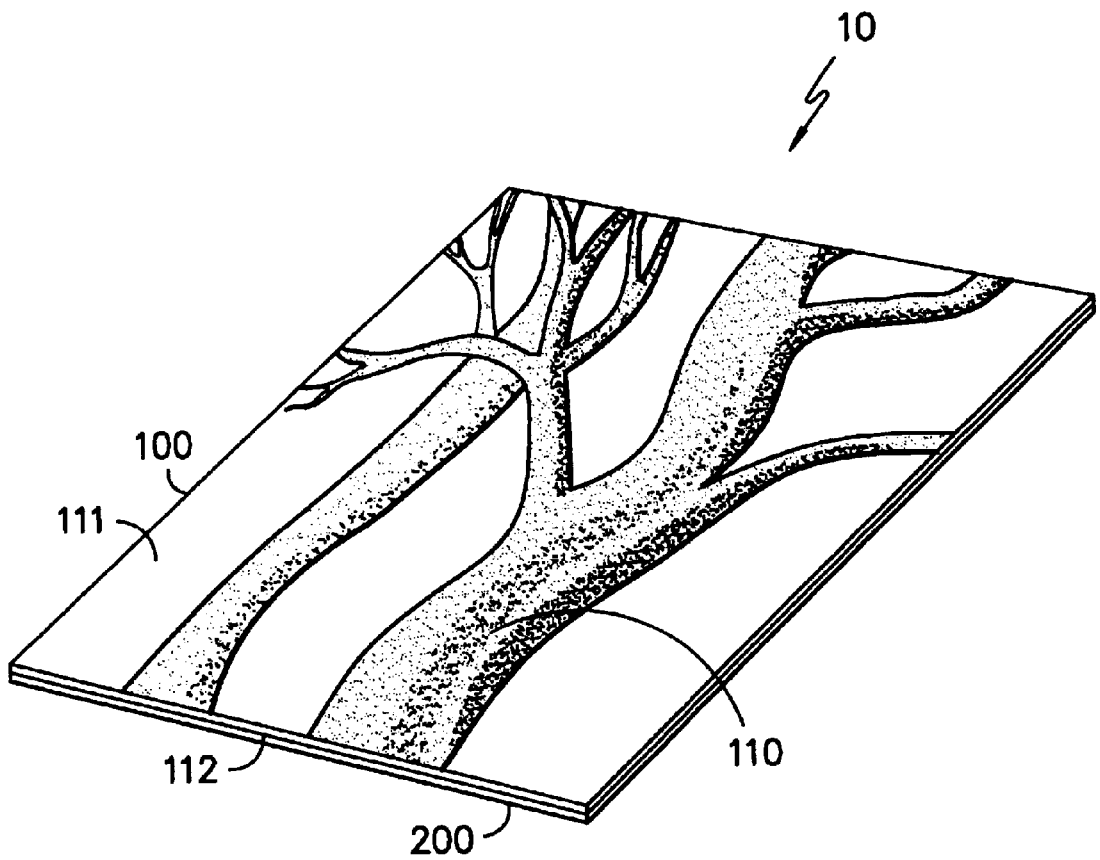
FIG. -1-

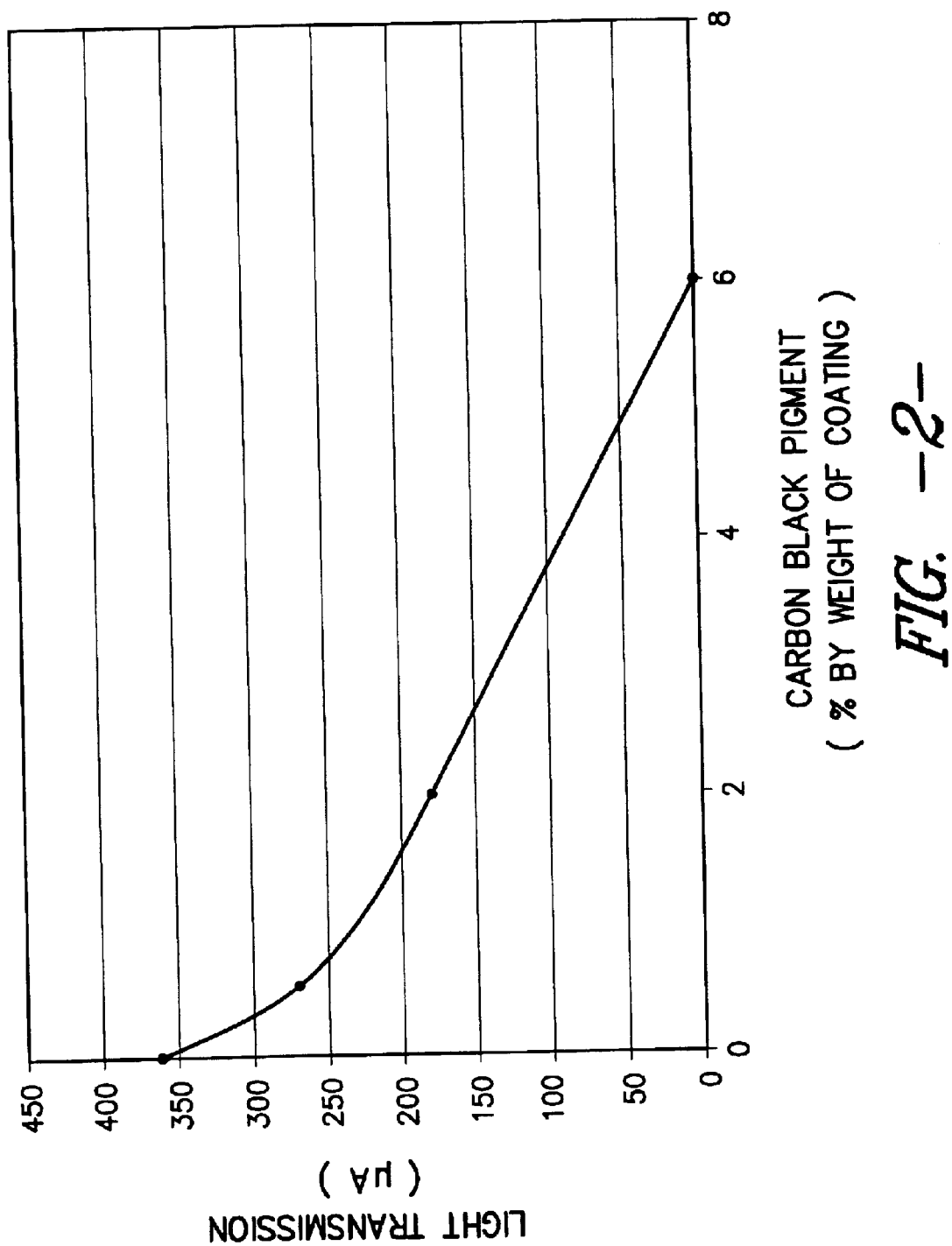
FIG. -2-

CAMOUFLAGE

BACKGROUND

The primary purpose of camouflage is to hide a person or an object. This is often accomplished using a fabric printed with a camouflage pattern. The pattern may resemble tree limbs, leaves, rocks, and attempts to appear three dimensional. The colors selected for use in the printed pattern help blend the object into the environment, while the pattern provides an artificial depth and contrast to break up the outline of the person or object.

In camouflage used for applications such as blinds, translucent fabrics can result in the creation of silhouettes on the camouflage from a light source, such as the sun. For example, in a blind having a translucent camouflage, the sun behind the blind can create a silhouette on the camouflage material of a hunter inside the blind that is visible on the exterior of the blind. To overcome this problem, the prior art has used heavier weight material that will be less translucent. However, the increased bulk and weight of the heavier material makes the camouflage less desirable for packing in and out of hunting areas. Therefore, there is a need for camouflage material that is light blocking and light weight. Additionally, for applications such as hunting, the camouflage will need to be quiet, and have a high degree of flexibility at varying temperatures.

BRIEF DESCRIPTION OF THE DRAWINGS

FIG. 1 is a camouflage material incorporating the present invention.

FIG. 2 is a graph illustrating the opacity of one embodiment of the present invention.

DETAILED DESCRIPTION

Referring now to FIG. 1, there is shown a camouflage material 10, incorporating the present invention. The camouflage material 10 is a base textile 100 having a camouflage pattern 110 on an first side or surface 111 of the base textile 100, such as a pattern resembling tree trunks, branches, limbs, twigs, leaves, rocks, grass, weeds, or other natural designs. The camouflage pattern 110 can also be regions or zones of differing colors and/or shades that have a tendency to blend with the surrounding environment. The camouflage material 10 also includes a coating 200 on a second side or surface 112 of the base textile 100.

The base textile 100 can be natural materials, synthetic materials, or a blend thereof. The base textile can be woven, knit, nonwoven, or the like. The base textile 100 can be formed of monofilament, multifilament, and/or staple yarns. Additionally, the yarns forming the base textile 100 can be textured yarns. It has been found that textured yarns provide a better bond with the coating 200. It has also been found that textiles with lower weights per square area generally perform better in the field as the base textile 100 than heavier textiles.

The camouflage pattern 110 can be place onto the first side 111 of the base textile 100 by printing, silk screening, air brushing, transfer printing, lithograph, jet printing, screen printing or any other suitable method of applying a design to a textile. Alternatively, the base textile 100 can be formed with materials that create the camouflage pattern 110 on the first side of the base textile 100.

In the present invention, the coating 200 is a thermoplastic material that blocks light. The combination of the coating 200 and the base textile 100 provides a barrier to light such that shadows, such as shadows created by sunlight, are not visible on the opposite side of the camouflage material 10. When a 1000 ft.-candle light source (or 380 $\mu A$) (visual spectrum) is located adjacent to the camouflage pattern 110 side of the camouflage material 10, and a sensor is located adjacent to the coating 200 side of the camouflage 10, it was determined that a transmission of about 100 $\mu A$ or less provides adequate blocking of light to prevent shadows or silhouettes on the opposite side of the camouflage material 100, and more preferably of about 60 $\mu A$ or less. In one preferred embodiment, the coating 200 is an opaque coating.

The coating 200 should be flexible to allow movement, and a quiet coating to avoid sound detection. Additionally, the coating 200 should also be a material that is flexible without cold cracking to temperatures down to twenty degrees Fahrenheit below zero (−20° F.). Thermoplastic materials that can be used in the present invention include ethylene methyl acrylate, polypropylene, polyethylene, polyesters, or the like. It has been found by the present inventors that thermoplastic coating materials provide a coating that is flexible, quiet, and good cold cracking resistance. In particular, it has been found that ethylene methyl acrylate provides a flexible and quiet coating with good cold cracking resistance.

The coating 200 can be placed onto the second side 112 of the base textile 100 by hot melt coating, extrusion coating, laminating a sheet to the base textile, or other similar methods. In one preferred embodiment, the base material 100 and the coating 200 are selected such that the weight of the camouflage material 10 is about 5 oz/yd$^2$ or less, thereby providing a lighter weight camouflage material.

In one embodiment, the coating 200 is a thermoplastic material with a pigment. Pigments can include materials such as carbon black, iron oxide, or other light blocking pigments. In one preferred embodiment of the present invention, the coating 200 is a ethylene methyl acrylate thermoplastic with a carbon black pigment. In one embodiment, the coating 200 comprises about 2% or more of carbon black in the total weight of the coating 200. A surprising result of the present invention with a thermoplastic material having a carbon black pigment was, that the coating side of the camouflage material irradiated more heat from sunlight on the opposite side than the base textile without the coating.

The present invention can be better understood with reference to the Examples illustrated below. FIG. 2 is a graph illustrating a plot of the light transmission for the various Examples below. The values in FIG. 2 were determined with a 1000 ft.-candle light source (or 380 $\mu A$) (visual spectrum) being located adjacent to the camouflage pattern side 111 of the camouflage material 10, and a sensor located adjacent to the coating 200 side of the camouflage material 10. With the details of the Examples below, and the knowledge of FIG. 2, a person of ordinary skill in the art will understand how to extrapolate the desired light transmission values of the present invention to a specific working embodiment of the present invention.

EXAMPLE 1

In a first example of the camouflage material, the base textile was a plain weave textile formed of 70 denier per yarn textured polyester yarn, with about 85 yarns per inch in the warp direction and about 90 yarns per inch in the fill direction, and a weight of about 2 oz/yd$^2$. The base textile had a camouflage pattern 110, such as a Mossy Oak®, RealTree®, or Advantage® camouflage pattern, printed onto the first side of the base textile by transfer printing, or other suitable methods. The coating in this embodiment of the camouflage material was about a 3 mil. extrusion coating on the second side of about 94% by weight of ethylene methyl acrylate and about 6% carbon black. The coating was placed on the second side of the base textile by hot melt extrusion. The resulting camouflage material had a total weight of about 4 oz/yd$^2$. The camouflage material of this example had a transmission of about 0 $\mu$A, as illustrated in FIG. 2.

EXAMPLE 2

In a second example of the camouflage material, the base textile, camouflage pattern, and coating were the same as in Example 1, with the exception that the coating was of about 98% by weight of the ethylene methyl acrylate and about 2% of the carbon black. The camouflage material of this example had a transmission of about 180 $\mu$A, as illustrated in FIG. 2.

EXAMPLE 3

In a third example of the camouflage material, the base textile, camouflage pattern, and coating were the same as in Example 1, with the exception that the coating was of about 99% by weight of the ethylene methyl acrylate, and about 1% carbon black. The camouflage material of this example had a transmission of about 260 $\mu$A, as illustrated in FIG. 2.

EXAMPLE 4

In a forth example of the camouflage material, the base textile, camouflage pattern, and coating were the same as in Example 1, with the exception that the coating was of about 100% by weight of the ethylene methyl acrylate, with no contributing carbon black. The camouflage material of this example had a transmission of about 360 $\mu$A, as illustrated in FIG. 2.

What is claimed is:

1. A camouflage material comprising a base textile having a first side and a second side, said base textile comprising woven textured polyester yarns and having a camouflage pattern on the first side, and a coating including ethylene methyl acrylate and carbon black disposed on the second side of the base textile, wherein the base textile and the coating have a visible light transmission of about 100 $\mu$A or less of a 380 $\mu$A light source.

2. The camouflage material according to claim 1, wherein the camouflage pattern includes images of objects.

3. The camouflage material according to claim 2, wherein the images of the object in the camouflage pattern comprise items selected from the group consisting of: tree trunks, branches, leaves, twigs, rocks, weeds, and grass.

4. The camouflage material according to claim 1, wherein the base textile and coating have a transmission rate of about 60 $\mu$A or less of the 380 $\mu$A light source.

5. The camouflage material according to claim 1, wherein the coating comprises about 2% or more of the carbon black in the total weight of the coating.

6. The camouflage material according to claim 1, wherein the base textile and the coating have a weight of about 5 oz/yd$^2$ or less.

* * * * *